WILBUR E. DUVALL
INVENTOR.

BY *Lyon + Lyon*
ATTORNEYS

United States Patent Office 3,103,619
Patented Sept. 10, 1963

3,103,619
REGULATED POWER SUPPLY
Wilbur E. Du Vall, Gardena, Calif., assignor to The W. W. Henry Company, Huntington Park, Calif., a corporation of California
Filed Jan. 2, 1962, Ser. No. 163,766
3 Claims. (Cl. 323—56)

This invention relates to regulated power supplies and, more particularly, to improvements therein.

An object of this invention is the provision of a simple, yet capable, regulated-voltage power supply.

Another object of this invention is the provision of a novel regulated-voltage power supply.

Yet another object of the present invention is the provision of a power supply which, although using simple and inexepnsive components, can provide a regulated high D.C. voltage from an alternating-current source.

The above and other objects of this invention are achieved in an arrangement wherein there is provided a transformer having a saturable core. Alternating current is applied to the primary winding of this transformer. There are two secondary windings. A first of the two secondary windings is used as an output winding, and the second of the two secondary windings is used as a control winding. The first secondary winding supplies an output which is rectified in order to obtain direct current. A sample voltage is derived from the rectified output of the first secondary winding and compared with a reference to provide an error-voltage signal. The error-voltage signal is employed to short circuit the secondary winding at intervals sufficient to produce a desired amount of regulation in the output voltage.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
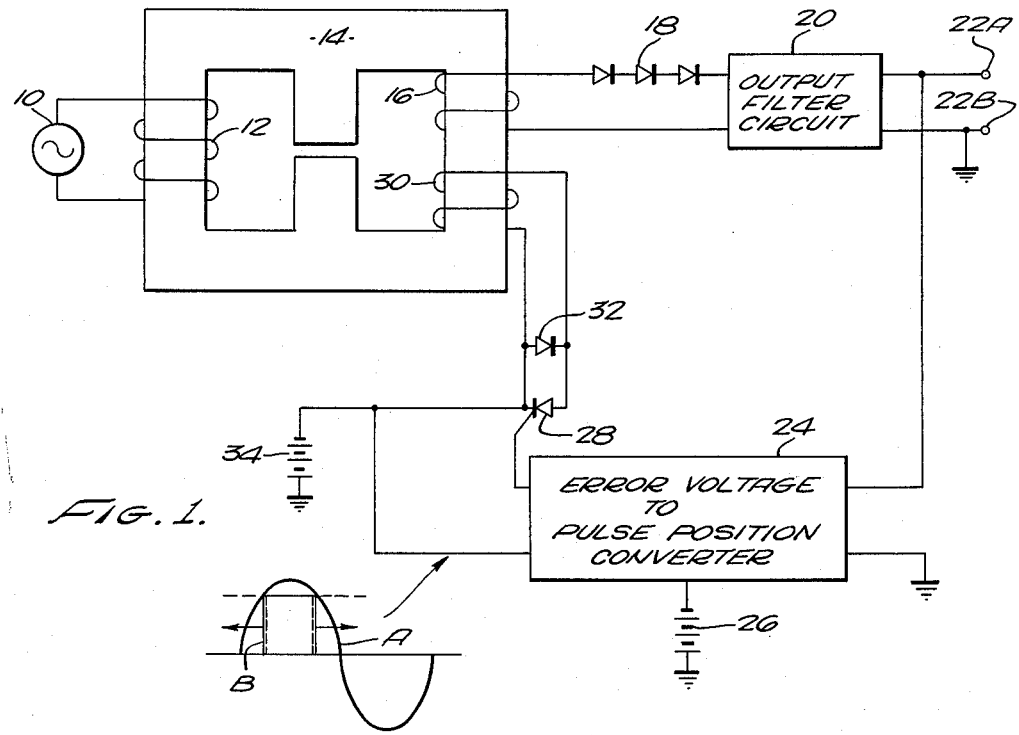
FIGURE 1 is a block schematic diagram of an embodiment of the invention.

Reference is now made to FIGURE 1 of the drawings, which shows an embodiment of the invention. This includes a source of power 10, which is connected to the primary winding 12 of a transformer. The transformer has a saturable core 14, here represented by a figure-eight-shaped metal core with an air gap in the center leg of the figure eight. Output is taken from a first secondary winding 16, which is wound on the leg of the core 14. The first secondary winding 16 is connected through a series of diode rectifiers 18 to an output-filter circuit 20. This can comprise the usual resistors and capacitors which are used to remove ripples from the rectified voltage. A pair of output terminals 22A, 22B afford points of connection to the circuit to supply an output load.

The sample voltage taken from the output side of the output-filter circuit 20 is applied to the circuit designated as an error-voltage-to-pulse-position converter 24. There is also applied a reference voltage from a source 26. The purpose of the error-voltage-to-pulse-position converter 24 is to compare the voltage sample taken from the output of the power supply with a reference voltage and to convert any difference to a pulse whose occurrence in time is a function of this difference. This pulse, which can be termed a time-voltage-error pulse, is applied to the control electrode of a silicon-controlled rectifier 28, to enable it to become conductive in the presence of such pulse. The anode and cathode of the silicon-controlled rectifier 28 are connected across another secondary winding 30, which is wound on the same leg of the transformer core 14 as the secondary winding 16.

The diode 32, which is connected in parallel with the silicon-controlled rectifier 28, furnishes half-wave rectified D.C. voltage required for current flow from the anode to cathode of the silicon-controlled rectifier by rectifying the half-wave current derived from the secondary winding 30, which is not rectified by the silicon-controlled rectifier. A bias source 34, connected to the cathode of the silicon-controlled rectifier 28, assists in establishing an instantaneous start for the silicon-controlled rectifier in response to a pulse signal.

Whenever the silicon-controlled rectifier 28 is rendered conductive, it effectively constitutes a short circuit across the secondary winding 30, drawing a heavy current as a result, and, as a further result, causing a saturation of the saturable core 14, whereby the voltage induced in the secondary winding 16 is considerably reduced. In consequence, the output voltage across the terminals 22A and 22B is reduced.

The result achieved by the circuit including the error-voltage-to-pulse-position converter and the silicon-controlled rectifier connected across the secondary winding 30 is to vary the occurrence of saturation of the core 14, with consequent voltage drop-off at the output terminals 22A and 22B, within the cycle of a sine wave derived from the source 10, in accordance with the difference between the sample voltage derived from the output of the power supply and the reference voltage. Thus, the voltage level to which the sine wave is permitted to rise will be higher or lower, depending upon the time of the occurrence of the output of the error-voltage-to-pulse-position converter. Thus, also, the voltage appearing at the output terminals 22A, 22B is regulated. By adjusting the amplitude of the reference-voltage source 26, regulation of the output voltage may be made to occur about any desired output-voltage value.

Figure 2:
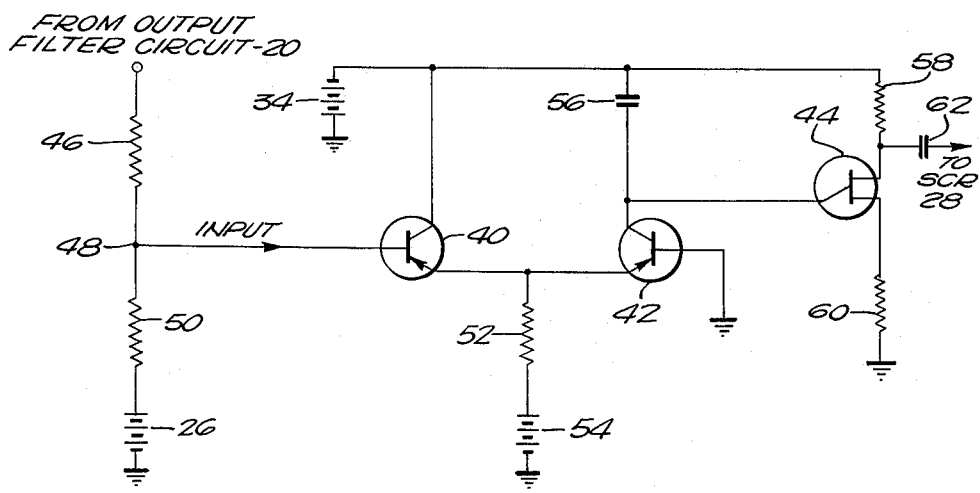
FIGURE 2 is a circuit diagram of an error-voltage-to-pulse-position-converter circuit which is employed in FIGURE 1.

Reference is now made to FIGURE 2, which is a circuit diagram of the error-voltage-to-pulse-position converter circuit 24. This circuit includes two transistors, respectively 40, 42, each having collector, emitter, and base electrodes, and a unijunction transistor 44, having the first and second base electrodes and control electrode. Voltage from the output filter 20 is applied through a resistor 46 to a junction 48, where it is compared with voltage from the reference source 26, which is also applied to the junction 48 through a resistor 50. The junction 48 is connected to the base of transistor 40. The collector of the transistor 40 is connected to the operating potential source 34, which also serves as the bias source for the silicon-controlled rectifier. The emitter of transistor 40 is connected through a resistor 52 to a source of bias potential, 54. The emitter of transistor 40 is also connected to the emitter of transistor 42. The collector of transistor 42 is connected to a capacitor 56 and also to the control electrode of the unijunction transistor 44. The other side of the capacitor 56 is connected to the source of potential 34 and through a resistor 58 to the second base of the unijunction transistor 44. The first base of the unijunction transistor 44 is connected through a resistor 60 to ground. An output is taken from the unijunction transistor second base through a capacitor 62, which is connected to the control electrode of the silicon-controlled rectifier 28.

The operation of the circuit is as follows. Capacitor 56 charges up to a voltage level sufficient to cause a unijunction transistor 44 to become conductive through a path which includes the transistor 42. The length of time required for the capacitor 56 to charge up to the requisite voltage is determined by the conductive condition of transistor 42. This, in turn, is determined by the signal applied to the emitter of transistor 42 from the emitter of transistor 40. The level of this signal depends upon the difference voltage existing at the junction 48, which is connected to the base of transistor 40. This voltage depends upon the level of the sample voltage derived from the output of the regulator circuit. The higher this voltage, the more conductive transistor 42 is rendered, and, therefore, the sooner capacitor 56 charges up to the voltage level at which unijunction transistor 44 is rendered conductive. The sooner unijunction transistor 44 is rendered conductive, the sooner a pulse is applied to the silicon-controlled rectifier to render it conductive. Thereby, the voltage which is rectified by the rectifiers of the power supply does not attain as high a level as it could attain, were the unijunction transistor rendered conductive at a later time, or not at all. The capacitor 56 discharges through the unijunction transistor when it is rendered conductive. The discharge time is fixed; only the charging is varied. Thus, the width of the pulse applied to the silicon-controlled rectifier is fixed; only its commencement time is variable.

There has accordingly been described and shown herein a novel, useful, simple, and inexpensive voltage-regulated power supply.

I claim:

1. A voltage-regulated power supply comprising a transformer having a saturable core, a primary winding wound on said core, a first and second secondary winding wound on said core, means for applying alternating-current potential to said primary winding, rectifier means connected to said first secondary winding, output terminals to which said rectifier means are connected, means connected to said output terminals for deriving an error voltage representative of a deviation of the voltage at said output terminals from a predetermined value, and means for substantially short-circuiting said second secondary winding responsive to said error voltage in order to restore said output voltage to a predetermined value.

2. A voltage-regulator circuit comprising a transformer having a saturable core, a primary winding coupled on said saturable core, a first and second secondary winding wound on said saturable core, a pair of output terminals, rectifier means connecting said pair of output terminals to said first secondary winding, a silicon-controlled rectifier having an anode, cathode, and control electrode, means connecting said silicon-controlled rectifier anode and cathode across said second secondary winding, means establishing a reference voltage, means to which said reference voltage and the output from said output terminals is applied for comparing said voltages to establish a resultant error voltage, and means to which the control electrode of said silicon-controlled rectifier is connected to render said silicon-controlled rectifier conductive at times dependent upon said error voltage to return the voltage at said output terminals to a predetermined level.

3. A voltage-regulated power supply comprising a transformer having a saturable core, a primary winding and a first and second secondary winding wound upon said core, a pair of output terminals, rectifier means connecting said first secondary winding to said output terminals, a silicon-controlled rectifier having an anode and cathode respectively connected across said second secondary winding and a control electrode, a source of reference voltage, means to which said source of reference voltage and said output terminals are connected for comparing said voltages to produce an error voltage representative of their difference, a capacitor, means for charging said capacitor at a rate determined by the amplitude of said error voltage, means for discharging said capacitor when the charge thereon attains a predetermined level, and means for applying a pulse to said silicon-controlled rectifier control electrode to render said silicon-controlled rectifier conductive whenever said capacitor is discharged.

References Cited in the file of this patent
UNITED STATES PATENTS
2,734,164    Knowlton _____ Feb. 7, 1956